United States Patent
Reichenbach et al.

(10) Patent No.: US 8,939,165 B2
(45) Date of Patent: Jan. 27, 2015

(54) MICROVALVE, MICROPUMP AND MANUFACTURING METHOD

(75) Inventors: Ralf Reichenbach, Esslingen (DE); Peter Rothacher, Bruchsal (DE)

(73) Assignee: Robert Bosch GmbH, Stuttgart (DE)

( * ) Notice: Subject to any disclaimer, the term of this patent is extended or adjusted under 35 U.S.C. 154(b) by 954 days.

(21) Appl. No.: 13/062,912

(22) PCT Filed: Sep. 7, 2009

(86) PCT No.: PCT/EP2009/061518
§ 371 (c)(1), (2), (4) Date: Mar. 8, 2011

(87) PCT Pub. No.: WO2010/029031
PCT Pub. Date: Mar. 18, 2010

(65) Prior Publication Data
US 2011/0168936 A1 Jul. 14, 2011

(30) Foreign Application Priority Data

Sep. 12, 2008 (DE) .......................... 10 2008 042 054

(51) Int. Cl.
| | | |
|---|---|---|
| F16K 51/00 | (2006.01) | |
| F16K 99/00 | (2006.01) | |
| F04B 19/00 | (2006.01) | |
| F04B 43/04 | (2006.01) | |

(52) U.S. Cl.
CPC ........... *F16K 99/0001* (2013.01); *F04B 19/006* (2013.01); *F04B 43/043* (2013.01); *F16K 99/0009* (2013.01); *F16K 99/0057* (2013.01); *F16K 2099/008* (2013.01); *F16K 2099/0094* (2013.01)
USPC .......................... 137/15.18; 251/11; 137/843

(58) Field of Classification Search
USPC .......... 137/843, 515.5, 543, 2, 15.18; 251/11, 251/129.01, 331, 368
See application file for complete search history.

(56) References Cited

U.S. PATENT DOCUMENTS

| | | | |
|---|---|---|---|
| 6,073,482 A | 6/2000 | Moles | |
| 7,025,324 B1* | 4/2006 | Slocum et al. | ................... 251/11 |
| 2005/0180891 A1 | 8/2005 | Webster et al. | |
| 2011/0053151 A1* | 3/2011 | Hansen et al. | ..................... 435/6 |

FOREIGN PATENT DOCUMENTS

| | | |
|---|---|---|
| DE | 19530843 | 5/1996 |
| DE | 102006003744 | 9/2007 |
| DE | 102008003792 | 7/2009 |
| GB | 2295441 | 5/1996 |
| WO | WO 99/017749 | 4/1999 |
| WO | WO 2007/085434 | 8/2007 |

OTHER PUBLICATIONS

International Search Report, PCT International Patent Application No. PCT/EP2009/061518, dated Nov. 17, 2009.
Nguyen N-T et al: "A fully Polymeric Micropump with Piezoelectric Actuator" Sensors and Actuators B, Elsevier Sequoia S.A., Lausanne, CH, vol. 97, No. 1, Jan. 1, 2004 pp. 137-143.

* cited by examiner

*Primary Examiner* — Kevin Lee
*Assistant Examiner* — P. Macade Nichols
(74) *Attorney, Agent, or Firm* — Kenyon & Kenyon LLP

(57) ABSTRACT

A microvalve, in particular for a micropump, is described, which includes a valve member which is adjustable between an open position and a closed position, in contact with a valve seat in its closed position. The valve seat is made of a polymer material. A micropump and a manufacturing method are also described.

28 Claims, 6 Drawing Sheets

16, 17

16, 17

MICROVALVE, MICROPUMP AND MANUFACTURING METHOD

FIELD OF THE INVENTION

The present invention relates to a microvalve, in particular for a micropump and a method for manufacturing a microvalve and/or a micropump.

BACKGROUND INFORMATION

Conventional micropumps are used for controlled and highly precise dispensing of conventional insulin. For example, European Patent No. EP 1 651 867 Bi describes a micropump, which is designed as a complex layer system.

Conventional micropumps usually include at least one inlet valve and at least one outlet valve. These micropumps have a valve member, usually piston-shaped, which is adjustable between an open position and a closed position and is in a more or less sealing contact with a stationary valve seat in the closed position. There is the problem in general of suboptimal sealing of a valve in its closed position, which is sometimes manifested in unacceptable leakage rates and/or reduced operating pressures.

SUMMARY

An object of the present invention is to provide a microvalve, in particular for a micropump, which has an improved tightness in its closed position. Furthermore, an object is to provide a micropump having a microvalve improved in this way as well as a method for manufacturing such a microvalve and/or such a micropump.

All combinations of at least two features described below or the and/or illustrated in the figures fall within the scope of the present invention. To avoid repetition, such features which are described with regard to an example method according to the present invention should also be considered as described according to the device. Likewise, features described with regard to the example device should also be considered as described with regard to the method.

The unacceptable leakage rates which occur with conventional microvalves are typically attributable to a suboptimal sealing pairing. The sealing pairing in the case of a conventional microvalve manufactured from silicon is usually composed of two hard sealing materials, for example, Si and $Si_3N_4$ or Si and glass or Si and $SiO_2$, etc.

In accordance with the present invention, in order to improve the sealing effect of a microvalve, the valve seat which cooperates sealingly with the valve member in the blocked position of the valve member is made of a preferably elastic polymer material. The polymer material here is preferably softer than the valve member material, so that an optimal sealing pairing is achievable with the resulting reduced leakage rate. A microvalve designed according to an example embodiment of the present invention is suitable in particular for use in micropumps, which are ideally suited for administering medication, preferably highly concentrated and easily overdosable medications, such as insulin, morphine, etc., due to the improved microvalve sealing effect.

In a refinement of the present invention, as described above, it is advantageous if the polymer material forming the valve seat is softer than the valve member material to thus further optimize the sealing effect. The polymer material is most preferably an elastic material to maintain the improved sealing effect over the lifetime of the microvalve.

A specific example embodiment of the microvalve, in which it includes at least two, in particular different material layers as a multilayer structure, the valve member, which is adjustable in relation to the valve seat, being formed in a function layer, which is most preferably formed from a semiconductor material. A specific embodiment in which the valve member may be acted upon by spring force with the aid of springs in the direction of the valve seat is particularly preferred, it being additionally preferred if the springs in the function layer forming the valve member are designed as spiral springs, for example.

It is particularly preferred if the valve seat of polymer material is formed by an insert part which is most preferably made completely of a polymer material. The insert part or at least some sections thereof are accommodated in or inserted into a recess in a layer directly or merely indirectly adjacent to the function layer and thus come into sealing contact therewith in the closed position of the valve member. It is particularly preferred if the insert part is at the same time designed as sealing for connecting the microvalve or a micropump equipped with the microvalve to a fluid system, in particular to a fluid block, so the insert part simultaneously fulfills at least two sealing effects, preferably on two sides facing away from one another. The layer having the recess in the multilayer structure having the function layer may be a layer directly adjacent to the function layer or alternatively may be a layer at a distance from the function layer via at least one additional layer. The insert part has at least one channel for supplying fluid to or removing it from the microvalve. It is particularly preferable if the channel opens or begins in an area radially inside the actual valve seat.

A specific example embodiment, in which the layer having the recess for the insert part is designed as a stable carrier layer, which supports the microvalve construction or the function layer having the movable valve member, is most particularly preferred. It is particularly preferred if the stable carrier layer is formed from a harder material than the function layer. For example, the carrier layer having the recess may be made of a glass.

In a refinement of the present invention, it is advantageously provided that the insert part having or forming the valve seat protrudes beyond the recess and thus beyond the layer having the recess, in particular the carrier layer, in the direction of the valve member, preferably having a section in the form of a truncated cone, preferably so that the valve member is placed under prestress, so that the leakage rate and thus the safety of a micropump equipped with such a microvalve, may be further improved.

To allow a defined positioning of the insert part in relation to the adjustable valve member, it is particularly preferred if a stop, preferably formed in the function layer and most particularly preferably a ring-shaped stop is provided for the insert part, limiting the insertion movement of the insert part into the recess in a defined manner.

For easier centering and to ensure a tight connection between the insert part and the at least one layer having the recess, it is particularly preferred if the recess is designed to taper in the direction of the valve member, preferably in the form of a truncated cone, in particular conically, so that at least one section of the insert part should be designed to be congruent in shape to the recess in order to achieve an optimal sealing effect.

To allow an optimal hold of the insert part in the layer having the recess, it is preferable if the insert part is fixedly connected to the layer having the recess, preferably by gluing or welding. Additionally or alternatively, the insert part may be fixedly connected to any layer, preferably an outer layer of the multilayer structure, in particular by welding or gluing.

A specific example embodiment in which the insert part includes a section, in particular plate-shaped, which protrudes above the recess radially and is in contact with a layer of the multilayer structure, in particular on the outside of the layer having the recess, is particularly advantageous. At the same time, the plate-shaped section preferably forms a seal for connecting the microvalve to a fluid block or carries such a sealing section. There are several possibilities for manufacturing the insert part, which is preferably made completely of a polymer material. For example, it may be manufactured by hot stamping and/or microinjection molding and/or thermal polymerization and/or UV polymerization, etc. The insert part is ideally provided in a polymer material which is incompletely polymerized, i.e., is post-crosslinkable and may be fully polymerized/crosslinked in the recess during and/or after joining, so that a reliable connection to the layer having the recess, in particular a layer of a silicon compound and/or a glass is manufacturable. The multilayer structure, preferably the layer having the recess, is ideally modified (previously) at the surface for this purpose so that reactive groups are available for the bonding operation. However, the actual valve seat should already be completely polymerized before being joined, or the mating surface of the valve seat of the valve member should be made of a material and/or have a coating which does not enter into any interaction with the valve seat in joining (full polymerization).

In a specific embodiment, which is most particularly preferred, at least two push-in sections for one microvalve are each formed on a plate-shaped section. In other words, the insert part simultaneously forms two valve seats at a distance from one another, preferably for two different microvalves.

The present invention is also directed to a micropump, in particular for dosing highly concentrated easily overdosable medications such as insulin, morphine, etc. Such a micropump is characterized by at least one microvalve as described. The at least one inlet valve as well as the at least one outlet valve of such a micropump are both preferably designed as described previously.

In addition, the present invention is also directed to a method for manufacturing a microvalve, preferably designed as described above, and/or for manufacturing a micropump, preferably designed as described above. According to the method, the valve seat is manufactured from a polymer material, which is preferably softer and/or more elastic than the valve member material.

The valve seat is particularly preferably designed on an insert part, preferably made completely of polymer material, for example, by hot stamping and/or injection molding and/or by a suitably controlled or shaped polymerization. Such an insert part is then inserted into a recess in a multilayer system, preferably designed as a borehole, and is then preferably fixedly connected to the multilayer system.

It is most particularly preferred if the insertion of the insert part is limited in a defined manner by a stop, in particular a ring-shaped stop against which the insert part stops after traveling a defined insertion distance. The stop preferably surrounds the valve member in a radially outside area.

It is particularly preferred if the insert part is not yet completely crosslinked, i.e., is post-crosslinkable, when it is inserted into the recess and if full crosslinking and/or at least a more extensive crosslinking of the insert part takes place, preferably after insertion, preferably in such a way that a bond between the insert part and the at least one layer holding the insert part is formed at the same time. This may be promoted by the fact that the multilayer structure is surface modified in at least some sections in an area to be connected to the insert part, in particular in such a way that reactive groups are available for the bonding and full crosslinking process. The insert part is advantageously already fully polymerized in the area of the actual sealing seat before being inserted into the recess and/or the mating surface of the valve member is made of a material and/or a coating which does not enter into any interaction with the insert part in the full crosslinking process.

BRIEF DESCRIPTION OF THE DRAWINGS

Additional advantages, features and details of the present invention may be derived from the description of preferred exemplary embodiments below and on the basis of the figures.

DETAILED DESCRIPTION OF EXAMPLE EMBODIMENTS

Figure 1:
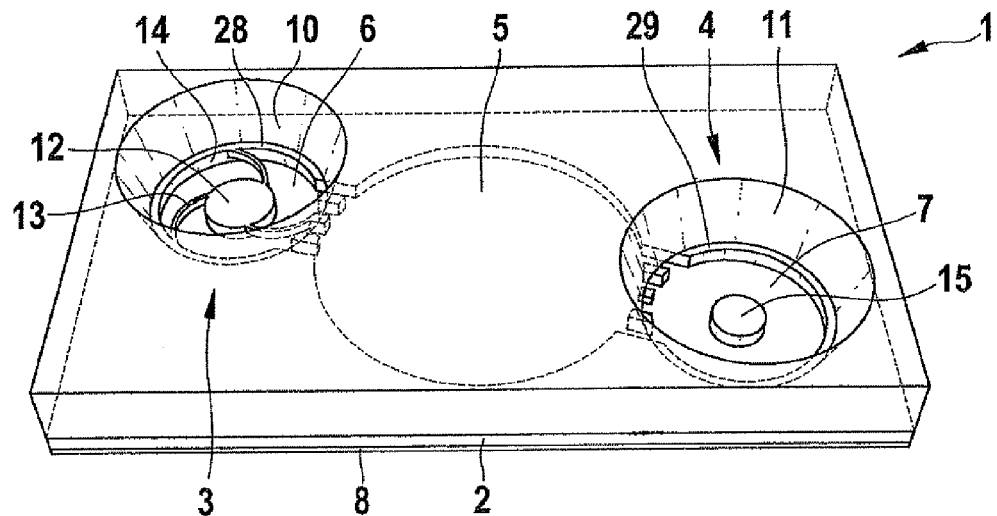
FIG. 1 shows a micropump, which is not yet complete and is designed as a multilayer structure having two microvalves but as yet without a valve seat.

In the figures, the same elements and elements having generally the same function are labeled with the same reference numerals.

FIG. 1 shows an intermediate stage of a micropump 1 for dispensing insulin, during its fabrication. Micropump 1 includes a function layer 2 made of a semiconductor material, silicon here, into which function elements (described below) are introduced. Micropump 1 includes a first microvalve 3 designed as an inlet valve and a second microvalve 4 designed as an outlet valve, microvalves 3, 4 cooperating with a pump chamber 5. Each microvalve 3, 4 has a valve chamber 6, 7, valve chambers 6, 7 and pump chamber 5 being formed in function layer 2 and being bordered by a movable diaphragm 8 (diaphragm layer) at the bottom in the plane of the drawing (cf. FIG. 2). In the plane of the figure at the top in FIG. 2, a layer 9 designed as a carrier layer made of a glass material is adjacent to function layer 2. A first recess 10 situated in layer 9 above first microvalve 3 and a second recess 11 situated above second microvalve 4 are shown. Centrally below first recess 10, there is a first flat cylindrical valve member 12, which is connected to circumferential edge 14, embodied by function layer 2, of first valve chamber 6 with the aid of three springs 13 designed as spiral springs distributed around the circumference. A second flat cylindrical valve member 15, which is fixedly connected to diaphragm 8 and is adjustable together with the latter in relation to the second recess, is located beneath second recess 11 in the plane of the drawing. Springs 13 are designed and situated in such a way that they apply spring force to first valve member 12 in the direction of first recess 10.

Micropump 1 is operable with the help of one, two or three actuators (not shown) situated beneath diaphragm 8. With regard to possible types of modes of operation or triggering options of micropump 1, reference is made to German Patent Application No. DE 10 2008 00 37 92.3, incorporated herein by reference in its entirety. This German patent application should be considered as disclosed and part of the present patent application, so that at least any one feature of the present patent application may be combined with at least any one feature of German Patent Application No. DE 10 2008 00 37 92.3.

Figure 3:
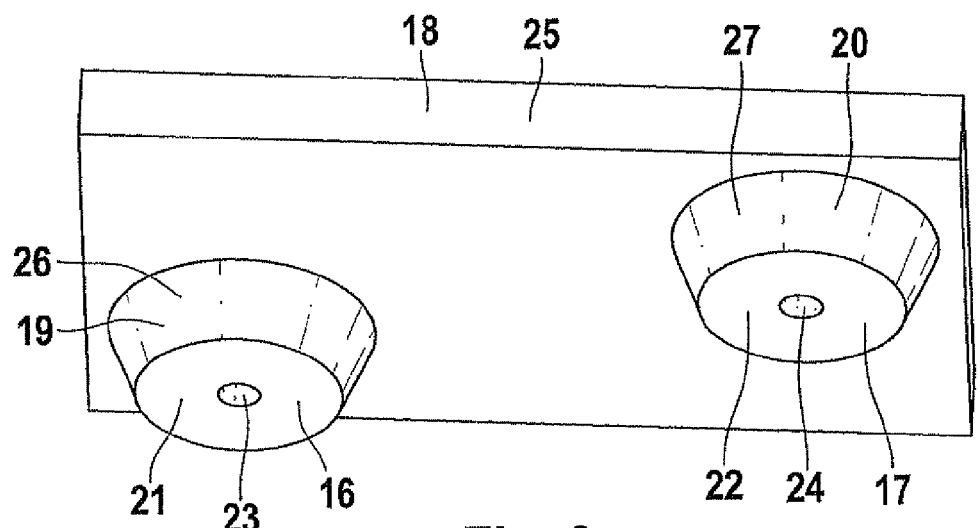
FIG. 3 shows an insert part of polymer material having valve seats designed thereon.

To be able to function as micropump 1, microvalves 3, 4 each lack a first or second valve seat 16, 17 shown in FIG. 3, on which first or second valve member 12, 15 is in sealing contact in its particular closed position.

FIG. 3 shows an insert part 18 made completely of polymer material, forming together with truncated conical sections 19, 20, which are at the bottom in the plane of the drawing, valve seats 16, 17, which are formed on end faces 21, 22 of truncated conical protrusions in the lower portion of the plane of the drawing. In an area radially inside of valve seats 16, 17, there is one channel 23, 24 each passing through insert part 18, first channel 23 being allocated to first microvalve 3 and functioning as an inflow channel, whereas second channel 24 is allocated to second microvalve 4 and functions as an outflow channel or discharge channel.

Figure 2:
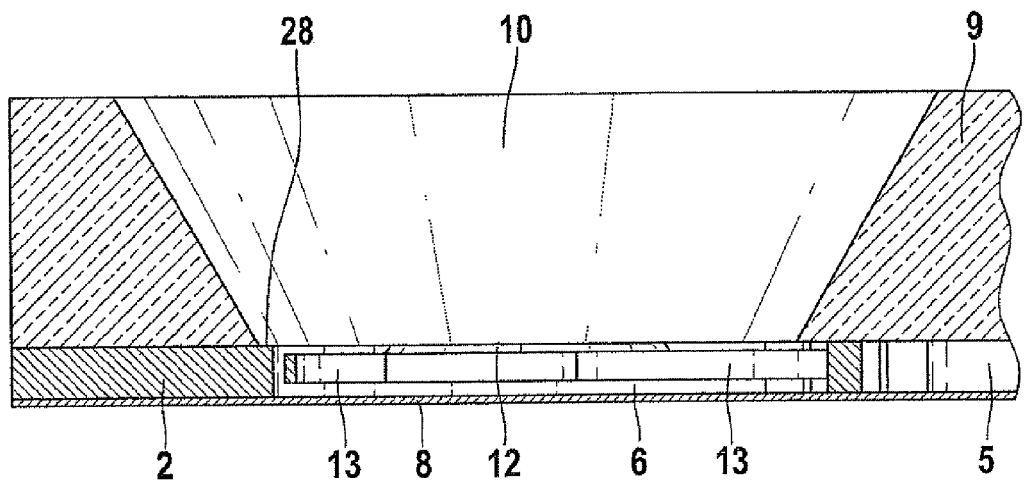
FIG. 2 shows a sectional diagram of the microvalve on the left in FIG. 1.

As shown in FIG. 3, truncated conical sections 19, 20 are integrally molded on a plate-shaped section 25 (carrier section), plate-shaped section 25 coming to lie in the mounted state on layer 9 of the layer system according to FIG. 1, which functions as the carrier layer. Sections 19, 20 in the mounted state form push-in sections 26, 27, which are accommodated in recesses 10, 11, sections 19, 20 protruding in a lower section above the recess in the direction of corresponding valve member 12, 15 and thereby prestressing particular valve member 12, 15. As shown in FIGS. 1 and 2, recesses 10, 11 are designed to taper in a truncated conical shape in the direction of particular valve member 12, 15. In order for push-in sections 26, 27 to be accommodatable in particular recess 10, 11, push-in sections 26, 27 are molded in shapes congruent to recesses 10, 11 in at least some sections.

As shown in FIG. 1, a ring-shaped stop 28, 29 is allocated to each section 19, 20 of insert part 18, formed within function layer 2 and bordering particular valve chamber 6, 7 radially on the outside.

Figure 4:
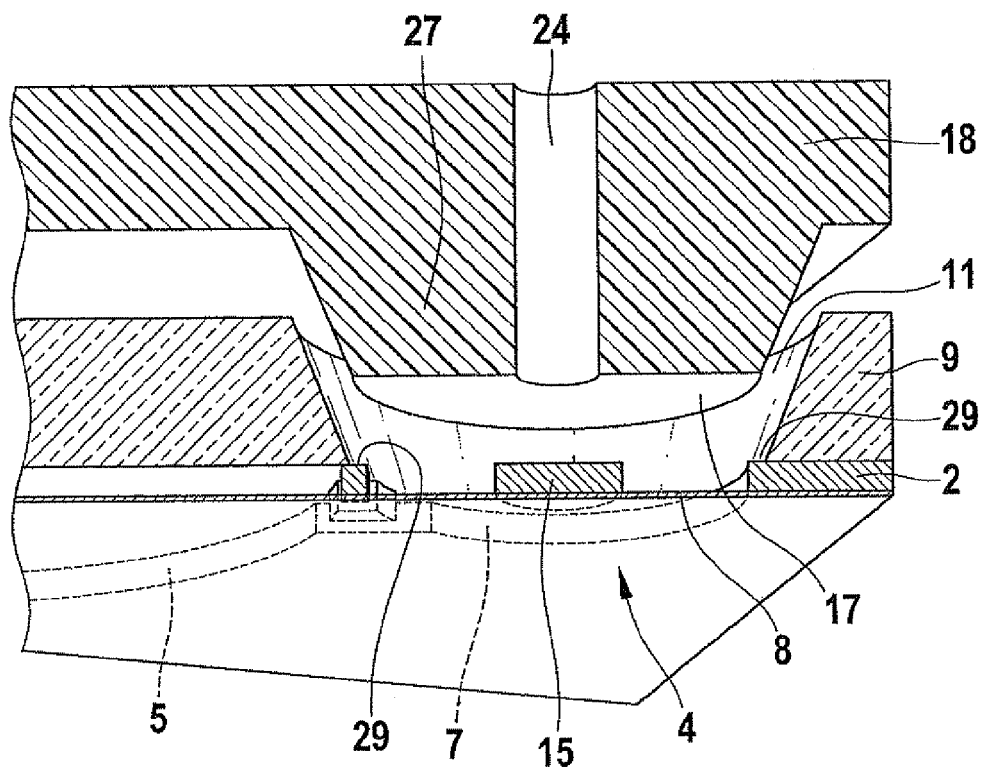
FIG. 4 shows an enlarged representation of the microvalve at the right in FIG. 1 in a sectional diagram during the insertion of the insert part according to FIG. 3.

FIG. 4 illustrates one step in assembly of insert part 18 according to FIG. 3 on the layer system shown in FIG. 1 for completion of microvalve 1, where for reasons of simplicity, the second microvalve 4, which functions as the outlet valve and is located in the right half of the FIG. 1, is shown only in a sectional diagram in FIG. 4. Diaphragm 8 having function layer 2 situated above it, as well as layer 9, which is designed as a backing layer made of glass and is situated above the former, having tapering second recess 11 to accommodate push-in section 27 of insert part 18 are shown. Furthermore, second channel 24 is shown here, passing through insert part 18 in the vertical direction and being sealed by second valve member 15 when second microvalve 4 is closed. The area on the end around the mouth opening of second channel 24 forms second valve seat 17. FIG. 4 also shows ring-shaped stop 29, which limits the push-in movement of insert part 18, more specifically push-in section 27.

Figure 5:
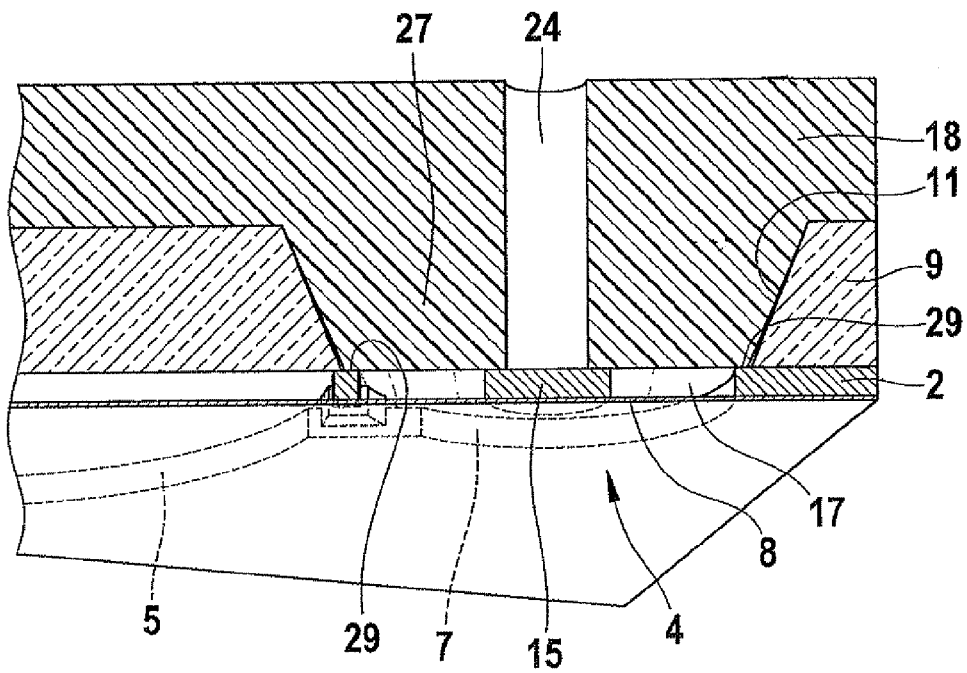
FIG. 5 shows a detail of the microvalve with the joined insert part.

Insert part 18 is preferably not yet completely crosslinked in the stage according to FIG. 4 and may be post-polymerized in the installed state shown in FIG. 5, so that a bond is formed between layer 9 and insert part 18, preferably both within second recess 11 and on top side 30 of layer 9 (at the top in the plane of the drawing) on which plate-shaped section 25 of insert part 18 rests.

Figure 6:
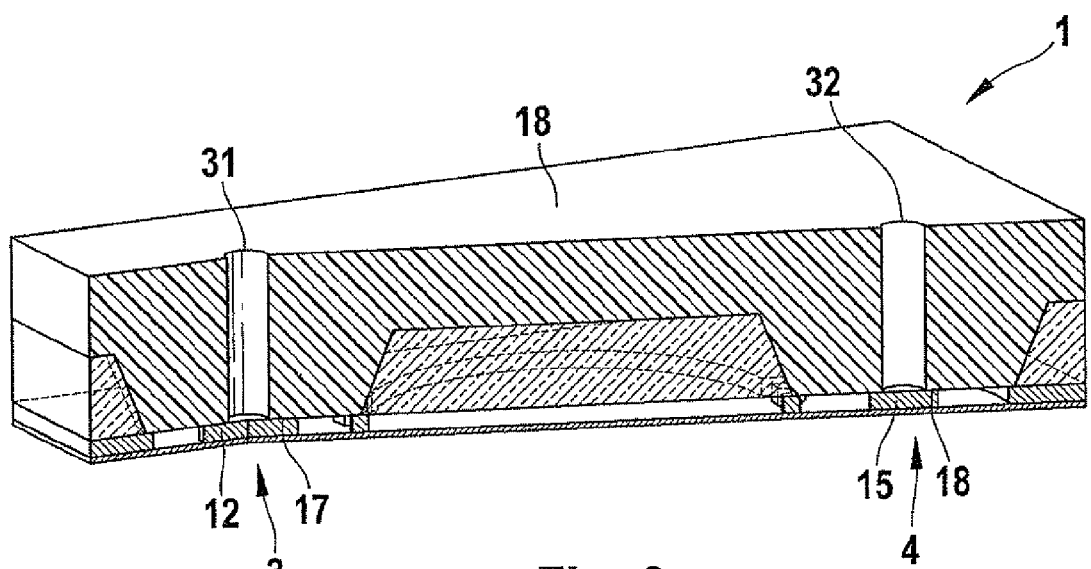
FIG. 6 shows a sectional diagram of the entire finished micropump, i.e., provided with valve seats.
Figure 7:
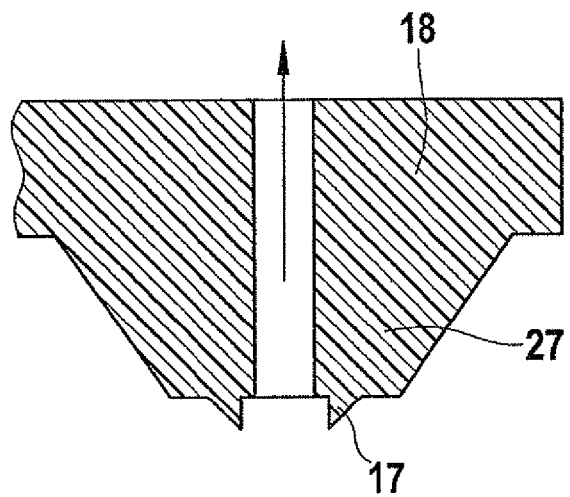
FIG. 7-FIG. 13 show different specific embodiments of microvalve seats made of a polymer material.
Figure 8:
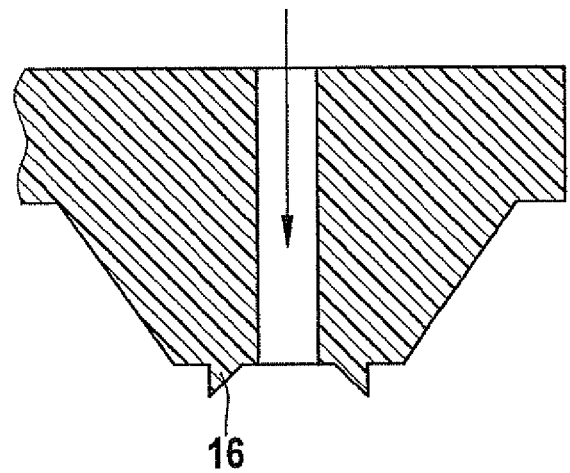

FIG. 6 shows the completely assembled micropump 1 without actuators. As shown, a valve seat 16, 17 made of a polymer material is assigned to each microvalve 3, 4 due to the integration of insert part 18 made of a polymer material. Insert part 18 at the same time functions directly as a seal 31, 32 for connecting micropump 1 to a fluid block.

FIGS. 7 through 13 illustrate possible different specific embodiments of insert part 18 and valve seat 16, 17 formed from the former. The specific embodiment according to FIG. 7 functions as valve seat 17 for an outlet valve, valve seat 17 being formed by a ring having a triangular cross section on the end face of push-in section 27. The inside flanks of valve seat 17 are straight, in contrast with the exemplary embodiment according to FIG. 8, which shows a valve seat 16 for an inlet valve, valve seat 16 here also being formed by a ring shape having a triangular cross section, but the inside flanks are chamfered and the outside flanks have a perpendicular shape.

Figure 9:
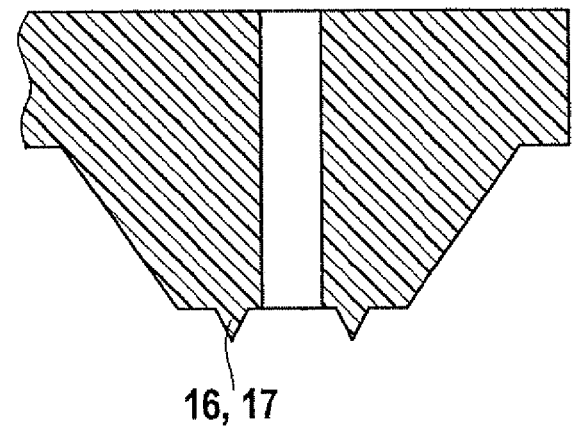

FIG. 9 shows a valve seat 16 in which both flanks of the ring which forms valve seat 16 are designed with a chamfer.

Figure 10:
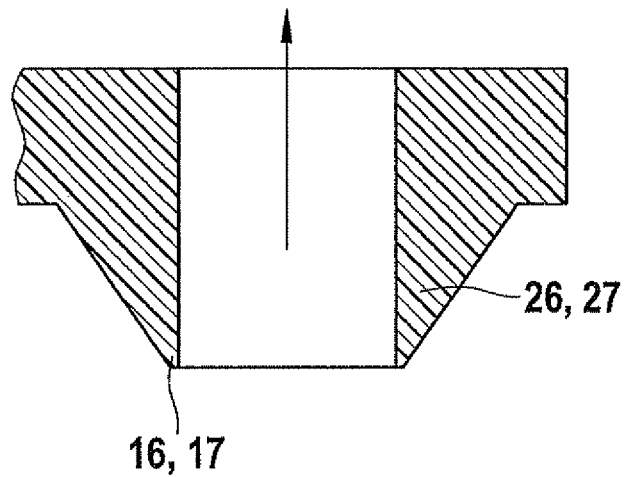

In the exemplary embodiment according to FIG. 10, valve seat 16, 17 is not embodied by an integrally molded section but instead is embodied directly by push-in section 26, 27, which tapers to a peripheral edge.

Figure 11:
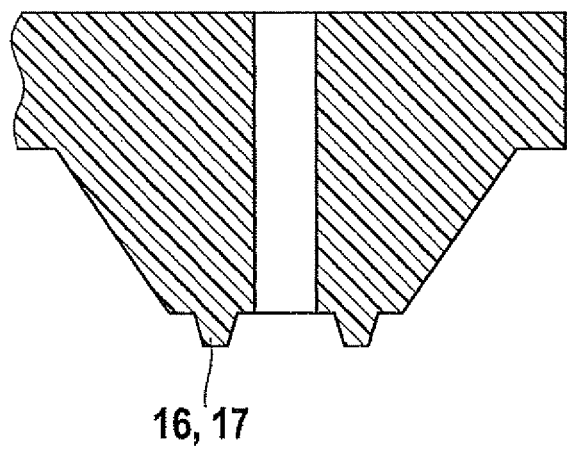
Figure 12:
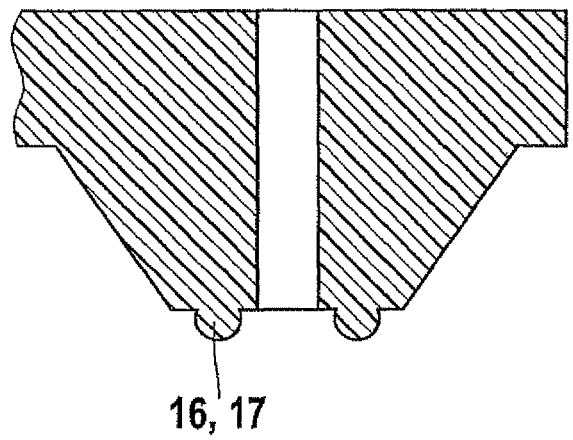
Figure 13:
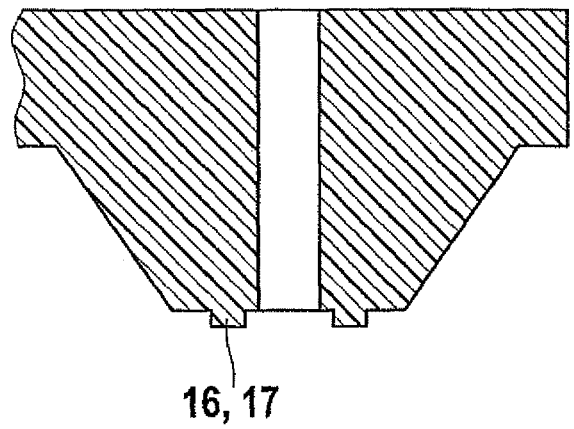

FIG. 11 illustrates a valve seat 16, 17 having a trapezoidal cross section, while FIG. 12 illustrates a valve seat 16, 17 having a partially circularly rounded cross section, and FIG. 13 illustrates a valve seat 16, 17 having a rectangular cross section. All valve seats 16, 17 illustrated in FIGS. 7 through 13 are usable alternatively with an inlet valve of a micropump 1 or with an outlet valve of a micropump 1.

In addition to the exemplary embodiments shown here, all valve seat shapes, which reduce the valve seat area and therefore increase the surface pressure, are implementable. Such structures are likewise also implementable on the top side of insert part 18 to thereby improve the sealing function between insert part 18 and a fluid block (not shown).

What is claimed is:

1. A microvalve system for a micropump, comprising:
   two microvalves having a multilayer structure, each of the two microvalves including a valve member which is adjustable between an open position and a closed position; and
   an insert part made of polymer material that forms two valve seats, the insert part also acting as a seal when in contact with the valve members in the closed position for closing the microvalves to a fluid system,
   wherein the insert part has a plate-shaped section and two push-in sections on the plate-shaped section, each of the two push-in sections being for a respective one of the two microvalves, the two push-in sections forming the valve seats and being insertable into respective separate recesses in a layer of the multilayer structure.

2. The microvalve system as recited in claim 1, wherein the polymer material forming the valve seat is softer and more elastic, than a material of the valve member.

3. The microvalve system as recited in claim 1, wherein the valve members are included in a function layer made of a semiconductor material.

4. The microvalve system as recited in claim 3, wherein the layer having the recesses is a stable carrier layer, which is made of a harder material than the function layer.

5. The microvalve system as recited in claim 4, wherein the layer having the recesses is made of one of glass or silicon.

6. The microvalve system as recited in claim 4, wherein the insert part protrudes by a truncated conical section beyond the recesses in a direction of the valve members.

7. The microvalve system as recited in claim 3, wherein a stop in a form of a ring, limiting a depth of insertion of the insert part, is provided in the function layer.

8. The microvalve system as recited in claim 1, wherein the recesses taper, conically in a direction of the valve members.

9. The microvalve system as recited in claim 3, wherein the insert part is fixedly connected to a layer adjacent to the function layer.

10. The microvalve system as recited in claim 9, wherein the insert part is fixedly connected to the layer adjacent to the function layer by one of gluing or welding.

11. The microvalve system as recited in claim 1, wherein the insert part is shaped by at least one of hot stamping, injection molding, and polymerization.

12. The microvalve system as recited in claim 1, wherein the valve seats each have a ring shape having a triangular cross section on end faces of the respective push-in sections, and wherein inside flanks of each of the valve seats are straight.

13. The microvalve system as recited in claim 1, wherein the valve seats each have a ring shape having a triangular cross section on end faces of the respective push-in sections, and wherein inside flanks of each of the valve seats are chamfered and outside flanks of each of the valve seats have a perpendicular shape.

14. The microvalve system as recited in claim 1, wherein the valve seats each have a ring shape having a triangular cross section on end faces of the respective push-in sections, and wherein inside flanks and outside flanks of each of the valve seats are chamfered.

15. The microvalve system as recited in claim 1, wherein each of the push-in sections tapers to a peripheral edge.

16. The microvalve system as recited in claim 1, wherein the valve seats each have a ring shape having a trapezoidal cross section on end faces of the respective push-in sections.

17. The microvalve system as recited in claim 1, wherein the valve seats each have a ring shape having a partially circular cross section on end faces of the respective push-in sections.

18. The microvalve system as recited in claim 1, wherein the valve seats each have a ring shape having a rectangular cross section on end faces of the respective push-in sections.

19. A micropump having a microvalve system, the microvalve system comprising:
two microvalves having a multilayer structure, each of the two microvalves including a valve member which is adjustable between an open position and a closed position; and
an insert part made of polymer material that forms two valve seats, the insert part also acting as a seal when in contact with the valve members in the closed position for closing the microvalves to a fluid system,
wherein the insert part has a plate-shaped section and two push-in sections on the plate-shaped section, each of the two push-in sections being for a respective one of the two microvalves, the two push-in sections forming the valve seats and being insertable into respective separate recesses in a layer of the multilayer structure,
wherein a first of the microvalves is an inlet valve and a second of the microvalves is an outlet valve.

20. The micropump as recited in claim 19, wherein the valve seats each have a ring shape having a triangular cross section on end faces of the respective push-in sections, and wherein inside flanks of each of the valve seats are straight.

21. The micropump as recited in claim 19, wherein the valve seats each have a ring shape having a triangular cross section on end faces of the respective push-in sections, and wherein inside flanks of each of the valve seats are chamfered and outside flanks of each of the valve seats have a perpendicular shape.

22. The micropump as recited in claim 19, wherein the valve seats each have a ring shape having a triangular cross section on end faces of the respective push-in sections, and wherein inside flanks and outside flanks of each of the valve seats are chamfered.

23. The micropump as recited in claim 19, wherein each of the push-in sections tapers to a peripheral edge.

24. The micropump as recited in claim 19, wherein the valve seats each have a ring shape having a trapezoidal cross section on end faces of the respective push-in sections.

25. The micropump as recited in claim 19, wherein the valve seats each have a ring shape having a partially circular cross section on end faces of the respective push-in sections.

26. The micropump as recited in claim 19, wherein the valve seats each have a ring shape having a rectangular cross section on end faces of the respective push-in sections.

27. A method for manufacturing a microvalve system having two adjustable valve members and two valve seats, wherein the valve members are adjustable between an open position and a closed position and are in contact with the two valve seats in the closed position, the method comprising:
forming the valve seats from a polymer material; and
forming an insert part that forms the valve seats by at least one of hot stamping injection molding, and polymerization, the insert part having a plate-shaped section and two push-in sections on the plate-shaped section, the two push-in sections forming the valve seats and being inserted into respective separate recesses of a multilayer system containing the valve members,
wherein the insert part is inserted in a post-crosslinkable state into the recesses and is post-crosslinked one of during or after the insertion, by at least one of UV exposure and temperature exposure, after prior surface treatment of the multilayer system, at least in an area to be joined to the insert part.

28. The method as recited in claim 27, wherein the insert part is inserted into the recesses until it strikes a stop formed in the multilayer system.

* * * * *